(12) United States Patent
Blady

(10) Patent No.: US 11,251,738 B2
(45) Date of Patent: Feb. 15, 2022

(54) DRIVE CIRCUIT FOR AN ELECTRIC MOTOR CIRCUIT

(71) Applicant: ZF AUTOMOTIVE UK LIMITED, Solihull (GB)

(72) Inventor: Dawid Blady, Solihull (GB)

(73) Assignee: ZF Automotive UK Limited, Solihull (GB)

( * ) Notice: Subject to any disclaimer, the term of this patent is extended or adjusted under 35 U.S.C. 154(b) by 0 days.

(21) Appl. No.: 16/996,964

(22) Filed: Aug. 19, 2020

(65) Prior Publication Data
US 2021/0099120 A1 Apr. 1, 2021

(30) Foreign Application Priority Data

Aug. 29, 2019 (GB) ...................................... 1912421

(51) Int. Cl.
*H02P 27/08* (2006.01)
*H02M 7/797* (2006.01)
*H02P 21/05* (2006.01)

(52) U.S. Cl.
CPC ............ *H02P 27/08* (2013.01); *H02M 7/797* (2013.01); *H02P 21/05* (2013.01)

(58) Field of Classification Search
CPC ...... H02P 1/00; H02P 1/04; H02P 1/12; H02P 1/16; H02P 1/163; H02P 1/18; H02P 1/24;
(Continued)

(56) References Cited

U.S. PATENT DOCUMENTS 8,212,507 B2 * 7/2012 Wystup ................... H02P 6/085
318/400.3
8,400,085 B2 * 3/2013 Rineh ....................... B60L 9/28
318/380
(Continued)

FOREIGN PATENT DOCUMENTS

CN 105897099 8/2016
CN 107134942 9/2017
CN 108183621 6/2018

*Primary Examiner* — Antony M Paul
(74) *Attorney, Agent, or Firm* — Tarolli, Sundheim, Covell & Tummino LLP

(57) ABSTRACT

A drive circuit comprises a two port LC inductive network with a source switch operable to switch the network between an ST state and an active state; an inverter and a controller for controlling the On-Off state of the switches of the inverter and the On-OFF state of the source switch, wherein the controller in use operates the switches to provide: a non-drive portion of the PWM period in which the source switch is held open and the top and bottom switches of at least one phase are held closed so that the drive circuit is operating in an ST mode, a drive portion of the PWM period which immediately follows or immediately precedes the non-drive portion in which the source switch is closed and the top and bottom switches are arranged, and in which the controller is configured to employ a PWM pattern in which all of the bottom switches or all of the top switches are moved from the closed state to an open state simultaneously, and further in which the source switch is moved from the open state to the closed state substantially at the start of the drive portion and is moved from the closed state to the open state substantially at the end of the drive portion.

14 Claims, 9 Drawing Sheets

(58) Field of Classification Search
CPC .... H02P 1/26; H02P 1/265; H02P 1/42; H02P 1/423; H02P 1/44; H02P 1/445; H02P 1/46; H02P 1/54; H02P 3/12; H02P 3/22; H02P 6/005; H02P 7/29; H02P 7/292; H02P 11/00; H02P 13/00; H02P 21/0003; H02P 23/0004; H02P 27/00; H02P 27/04; H02P 27/06; H02P 7/043; H02P 7/523; H02P 7/527; H02P 7/5395; H02P 2005/04
See application file for complete search history.

(56) References Cited

U.S. PATENT DOCUMENTS

| | | | |
|---|---|---|---|
| 9,796,277 B2* | 10/2017 | Hayslett | B62M 6/45 |
| 10,381,951 B1* | 8/2019 | Moradisizkoohi | H02M 7/4807 |
| 2019/0379316 A1 | 12/2019 | Rice et al. | |

* cited by examiner

DRIVE CIRCUIT FOR AN ELECTRIC MOTOR CIRCUIT

RELATED APPLICATION

This application claims priority from British Application No. 1912421.3, filed Aug. 29, 2019, the subject matter of which is incorporated herein by reference in its entirety.

FIELD OF THE INVENTION

The present invention relates to circuits used to drive an electric motor, and in particular to pulse width modulation (PWM) control of the switches of a Z-Source converter used to drive a multiple phase brushless motors.

BACKGROUND TO THE INVENTION

In order to control a brushless electric motor it is necessary to determine the position of the rotor of the motor and then control the current through the motor phase windings to produce the desired torque. The position can be measured using a dedicated position sensor or by estimating the position from other parameters using a position sensorless control scheme.

PWM control is typically implemented using a closed loop current controller of the kind shown in FIG. 1. Using pulse width modulation (PWM) control in response to a requested target current, a modulated voltage is applied to each phase winding of the motor and the resultant generated currents measured or estimated. The individual phase currents are then used by a controller, typically a PI controller, to generate the required pulse width modulated phase voltages to achieve the target current. The estimated position of the motor is used to ensure that the phase voltages can be applied to the correct phases at the correct times.

A typical prior art electric circuit 100 for a 3 phase motor is shown in FIG. 2. The driver comprises a 6 FET inverter 110 arranged to apply the desired voltages to the motor phase terminals of a motor 120 in a PWM pattern to achieve the desired phase currents. A filter 130 is provided across the battery source 140 to stabilize the input voltage. Using six switches, TA, TB, TC, BA, BB, BC each of which can be opened or closed, there are eight possible states for the switches of the inverter, two so called zero voltage states and six active states. The PWM pattern is constructed using Space Vector Modulation by combining, within each modulation period one or more active states with one or more of the zero states in a defined PWM pattern. Other non-SVM techniques are also taught in the literature.

A known problem with the electric circuit of FIG. 2 is that the obtainable motor phase voltages are lower than the source voltage. In an automotive application, where the source is a battery, this can lead to underperformance if the battery becomes drained. An alternative electric circuit 200 that overcomes these limitations is shown in FIG. 3. In this arrangement the filter 130 is replaced with a two port LC inductive network 210 of inductors and capacitors connected and a source switch 220 which can be opened or closed to control the transfer of power from the battery to the inductors of the LC network. This arrangement, combined with an inverter, is known in he literature as a bidirectional quasi Z-source converter or Power Quasi Z-source converter. For convenience the term Quasi Z-source converter will be used hereinafter to refer to this circuit where a source switch is provided.

The Z-source converter topology provides for an additional state for the bridge where a phase of the motor may be shorted through both the upper and lower switches of the phase and the source switch held open. This is known as a shoot through (ST) state as in this state current cannot flow through the FET diode into the motor phases. The other 8 conventional states where the source switch is closed are known as non-shoot through (NST) states. The Z-source converter therefore has two operating modes—an ST state or mode also referred to later in this specification as a non-drive mode and an NST state or mode also referred to hereinafter as a drive mode.

During the ST mode, the source switch is opened and inverter shorted so that power is transferred into the inductor. During the NST mode, the Z-FET is closed and the source and the two inductors may transfer energy to the load and charge the capacitors boosting the voltage available to be applied to the motor phases. The amount of voltage boost depends in part on the length of time spent in the ST mode during each PWM period—a longer time will provide a higher voltage but allow for a shorter NST time during which the motor can be driven using the higher voltage.

To protect the inverter switches, a further technique available when designing a motor drive circuit with a quasi Z-source converter that includes a source switch is to inject a short ST state around the time of the switching of the inverter switches by opening the switch just before and then closing at or just after the time the inverter switches are switched. This provides a form of negative deadtime.

According to a first aspect the invention provides a drive circuit for an electrical load such as a multi-phase motor, the drive circuit comprising:

a two port LC inductive network having a pair of input nodes and a pair of output nodes, the network comprising a source switch operable to switch the network between an ST state and an active state;

an inverter connected to the two output nodes of the LC inductive network having a plurality of top switches which selectively connect a respective phase of the load, to a first one of the two output nodes of the LC inductive network and a plurality of bottom switches which selectively connect a respective phase of the load to a second one of the two output nodes of the LC inductive network, and a controller for controlling the On-Off state of each of the switches of the inverter and the On-OFF state of the source switch, the controller in use operating the switches within each PWM period to provide:

a non-drive portion of the PWM period in which the source switch is held open and the top and bottom switches of at least one phase are held closed so that the drive circuit is operating in an ST mode, a drive portion of the PWM period which immediately follows or immediately precedes the non-drive portion in which the source switch is closed and the top and bottom switches are arranged so that for each phase the top and bottom switches are not held open at the same time so that he motor is operating substantially in an NST mode, and in which the controller is configured to employ a PWM pattern in which all of the bottom switches or all of the top switches are moved from the closed state to an open state simultaneously with the start of the drive portion and all of the bottom switches or all of the top switches are moved from the open state to the closed state simultaneously with the end of the drive portion, and further in which the source switch is moved from the open state to the closed state substantially at the start of the drive portion and is moved from the closed state to the open state substantially at the end of the drive portion.

The drive portion may have a fixed duration within each cycle of the PWM pattern. The position of the start and end of the drive portion in each cycle may therefore be fixed.

The drive portion of the PWM period may immediately follow the non-drive portion within the PWM period, and the controller may provide a second non-drive portion that immediately follows the drive portion in which the source switch is held open and the inverter top and bottom switches are also held open so that the drive circuit is operating in the ST mode.

The duration of the two portions may fill the PWM period.

In the arrangement with three portions, the drive portion is sandwiched between non-portions of operation with a PWM period.

The duration of three portions may fill the PWM period.

Where a third portion is provided, the sum of the durations of the first portion, second portion, and third portion, may equal the duration of the PWM period.

The LC network may comprise a quasi-Z-source converter topology. It may comprise pair of inductances and a pair of capacitance. Each inductance or capacitance may comprise a series of inductors or a series of capacitors or a single capacitor or inductor.

The duty ratio of the top switch and bottom switch in each phase during the drive portion may be set according to the required output of the motor. This in effect creates a separate PWM modulation of the inverter bridge within the drive portion of the overall PWM cycle, each drive portion representing a cycle for that sub-modulation. For a minimum amount of switching each phase will have one On time and one OFF time within each drive portion.

The source switch may be moved from the open state to the closed state shortly after the time at which all of the bottom switches or all of the top switches are moved from the closed state to an open state simultaneously with the start of the drive portion. This provides protection to the phases as the source is effectively isolated from the phases as the inverter switches are switched preventing any shoot through fault current.

The source switch may be moved from the closed state to the open state shortly before the time at which all of the bottom switches or all of the top switches are moved from the open state to the closed state simultaneously with the end of the drive portion. This provides protection to the phases as the source is effectively isolated from the phases as the inverter switches are switched which again prevents any shoot through fault current in the motor phases.

By using an edge aligned PWM pattern in fixed PWM edges are edge aligned with the start and the end of the drive portion of a PWM period, the number of switching operations of the source switch within each PWM period can be reduced compared with prior art centre aligned PWM patterns used for Z-source converter topologies. This is because the source switch of the LC network must first be switched off before a change in the state of the top and bottom inverter switches, and aligning some of the edges of the PWM pattern with the start and end of the drive portion reduces the number of times that the source switch must be opened and closed.

Most preferably the fixed edges of the PWM waveforms for all of the top switches are aligned with the start of the drive portion and the fixed edges of the PWM waveforms for all of the bottom switches are aligned with the end of the drive portion.

During the or each non-drive portion of the PWM period the source switch may be held open (non-conducting) continuously to disconnect the phase switches from the source.

The controller may therefore be configured to cause the source switch to change from open to closed only once, and from closed to open only once, during each PWM cycle. These may be aligned with the ends of the drive portion.

It is within the scope of this invention to insert additional short duration periods of time during the drive portion of the PWM pattern where the source switch is held open prior to and during the changing of state of a switch of the inverter before being closed again, as an alternative to use of dead time periods where all the inverter switches are held in an open state. This may prevent damage to the switches of the inverter.

For a three phase motor the insertion of the extra, short duration, time where the source switch is opened will result in up to three additional open-close cycles of the source switch within each PWM period to give a total of four open-close cycles in each PWM period.

However, holding the source switch closed for the whole of the second portion leads to an optimum solution in which the source switch is only opened and closed once in each PWM period, to define the transitions at the start and end of the drive portion.

For a leading edge aligned PWM scheme in which the leading edges of the top switches are all aligned with the start of the drive portion and the timing of the trailing edges of the top switches is modulated, the source switch of the LC network will already be open at the start of the drive portion and can then be closed after the leading edges have occurred or in synchronization with the leading edges of the PWM. Later the source switch can be opened shortly prior to the end of the drive portion.

Where there is a non-drive portion that commences at the start of each PWM cycle and another non-drive portion at the end of each PWM cycle, during continuous use these non-drive portions will run together to define one continuous non-drive period of operation in an ST mode spread across adjacent PWM cycles, interleaved with the drive portions in which the load, such as a motor, is actively driven.

During the non-drive portion or portions, the controller may cause all of the top switches and the bottom switches of the inverter to be closed so that the motor load is shorted across every phase.

The controller may control the inverter switches and the source switch by outputting respective voltage signals that are fed to a drive stage. The drive stage may convert these signals into respective voltages that are applied to the gate of each switch.

The controller may process a count signal from a counter which counts upwards from zero at the start of a PWM period to a maximum count value at or close to the end of the PWM period. The controller may determine the duty cycle for the PWM modulation of the inverter switches in the second portion of time which sets the temporal location of the varying edge of the PWM signals for each phase by defining a count value for that edge. The switches of the inverter may be switched at the time that the count is reached.

One node of the input ports of the LC network may be connected to a positive terminal of a voltage source, such as a battery, and the other to a negative terminal of the voltage source or to a ground.

The controller may open and close each top and bottom switch of the inverter only once during each PWM cycle. This may be performed during the drive portion of the PWM cycle.

The switches of the inverter may each be held closed at all time during the ST mode of operation.

Where the circuit is used in an automotive application the voltage source may comprise a battery of the vehicle, or a power bus which is fed from one or more batteries of the vehicle.

According to a second aspect the invention provides a method of driving a drive circuit for an electrical load such as a multi-phase motor, the drive circuit comprising:

a two port LC inductive network having a pair of input nodes and a pair of output nodes, the network comprising a source switch operable to switch the network between an ST state and an active state;

an inverter connected to the two output nodes of the LC inductive network having a plurality of top switches which selectively connect a respective phase of the load, to a first one of the two output nodes of the LC inductive network and a plurality of bottom switches which selectively connect a respective phase of the load to a second one of the two output nodes of the LC inductive network, and a controller for controlling the On-Off state of each of the switches of the inverter and the On-OFF state of the source switch, the method comprising the steps of causing the controller to operate the switches within each PWM period to provide:

a non-drive portion of the PWM period in which the source switch is held open and the top and bottom switches of at least one phase are held closed so that the drive circuit is operating in the ST mode, a drive portion of the PWM period which immediately follows or immediately precedes the non-drive portion in which the source switch is closed and the top and bottom switches are arranged so that for each phase the top and bottom switches are not held open at the same time so that he motor is operating substantially in the NST mode, and in which the controller is configured to employ a PWM pattern in which all of the bottom switches or all of the top switches are moved from the closed state to an open state simultaneously with the start of the drive portion and all of the bottom switches or all of the top switches are moved from the open state to the closed state simultaneously with the end of the drive portion, and further in which the source switch is moved from the open state to the closed state substantially at the start of the drive portion and is moved from the closed state to the open state substantially at the end of the drive portion.

BRIEF DESCRIPTION OF THE DRAWINGS

There will now be described by way of example only one embodiment of the present invention with reference to and as illustrated in the accompanying drawings of which.

DESCRIPTION

Figure 4A:
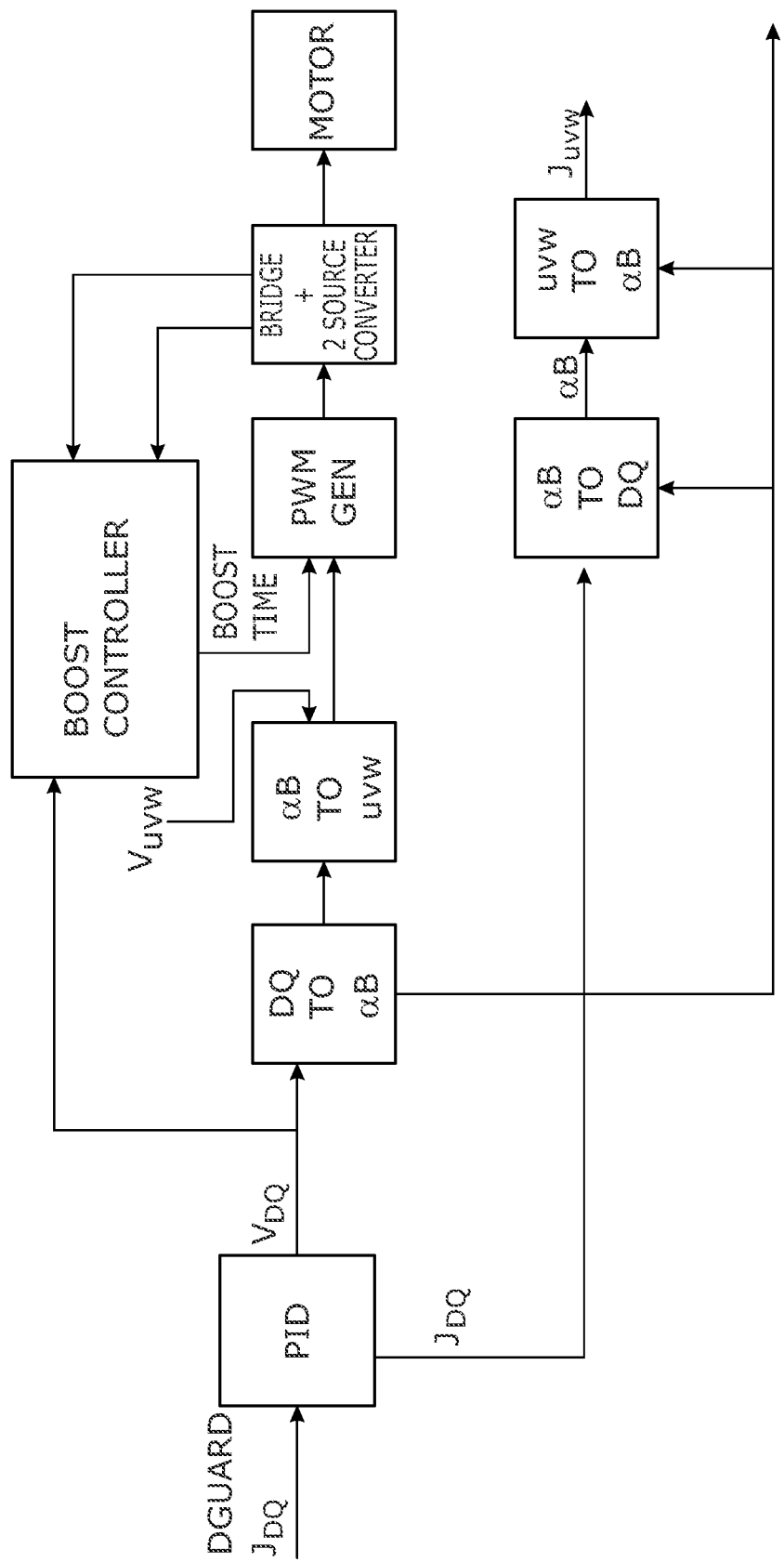
FIG. 4A is an exemplary control loop block diagram of electric circuit that incorporates a quasi-Z-source converter in accordance with a first aspect of the present invention
Figure 9A:
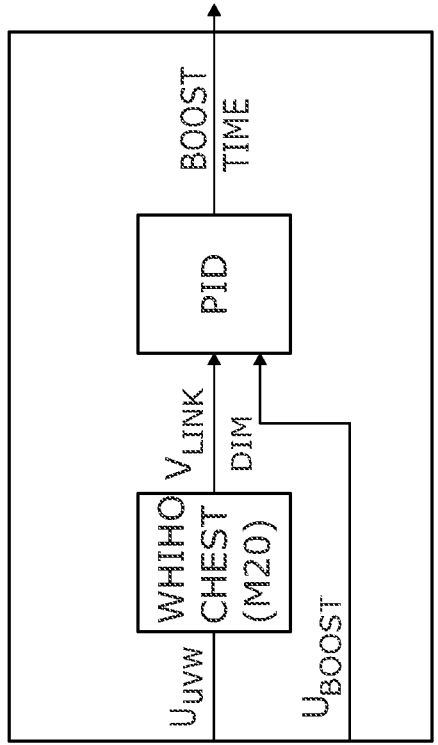
FIG. 9A shows a first exemplary controller that may be implemented in the circuit shown in FIG. 4.
Figure 9B:
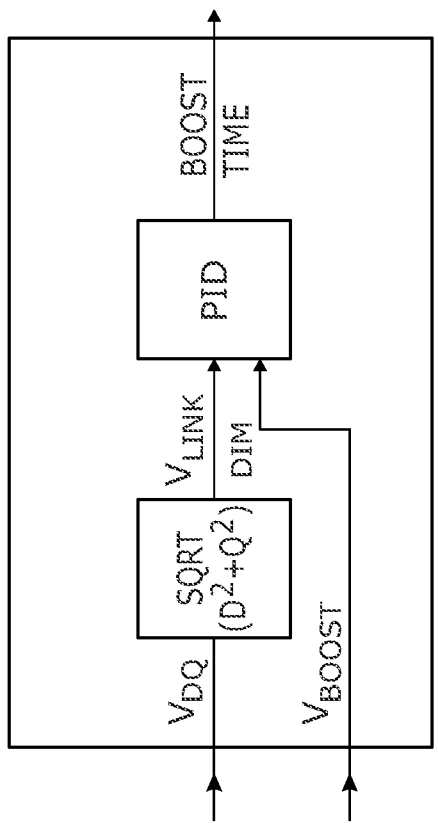
FIG. 9B shows a second exemplary controller that may be implemented in the circuit shown in FIG. 4.
Figure 9C:
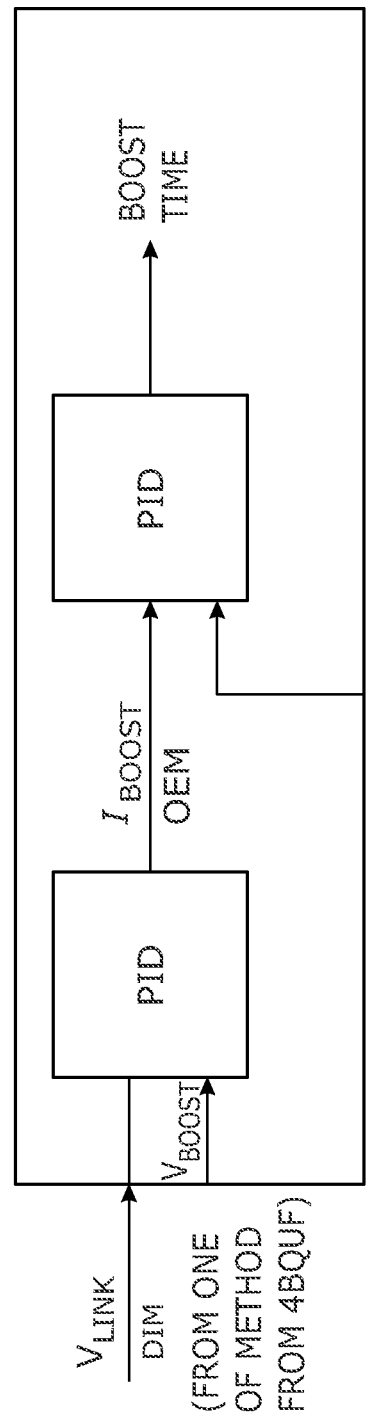
FIG. 9C shows a third exemplary controller that may be implemented in the circuit shown in FIG. 4.

As shown in FIG. 4(a) a motor circuit for controlling a multi-phase motor includes an embodiment of a Z-source converter 300 in accordance with the present invention. The converter 300 takes as an input the demanded phase voltages output from a PI controller and based on these applies appropriate PWM waveforms to each phase of the motor. FIG. 9 shows three exemplary implementations of a controller which may be implemented within the circuit of FIG. 4(a)

In the disclosed embodiment the Z-source converter has a quasi-Z source converter topology although the invention can be applied to other LC network topologies.

Figure 4B:
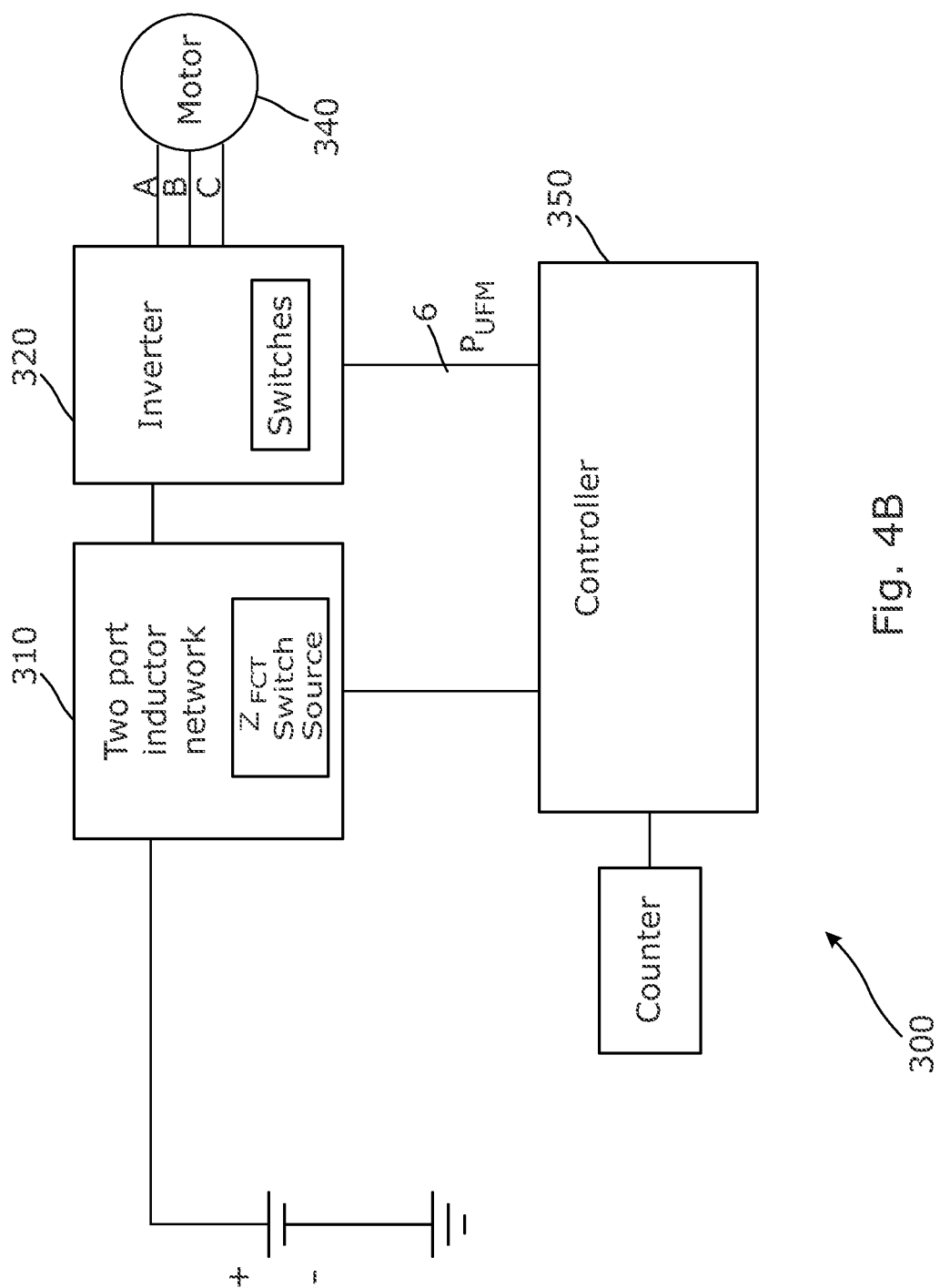
FIG. 4B shows in more detail part of the circuit of FIG. 4(a).

The quasi Z-source converter, as shown in FIG. 4(b) comprises a two port inductive LC network 310 an inverter bridge 320 and a controller which controls the state of the various switches of the circuit. The input to the circuit 300 is connected to the supply and ground terminals of a battery 330 and the output of the inverter is connected to a multi-phase motor 340. A controller 350 controls the switches of the circuit, This circuit allows the voltage applied to each phase to be varied which in turn allows the torque produced by the motor to be controlled. Due to the presence of the Z network the voltages may be higher than the voltage present at the battery source which makes this circuit especially suited to automotive applications where the state of battery may at times become depleted. This also allows the motor to be operated at a more optimal operation point for a given motor design.

Figure 1:
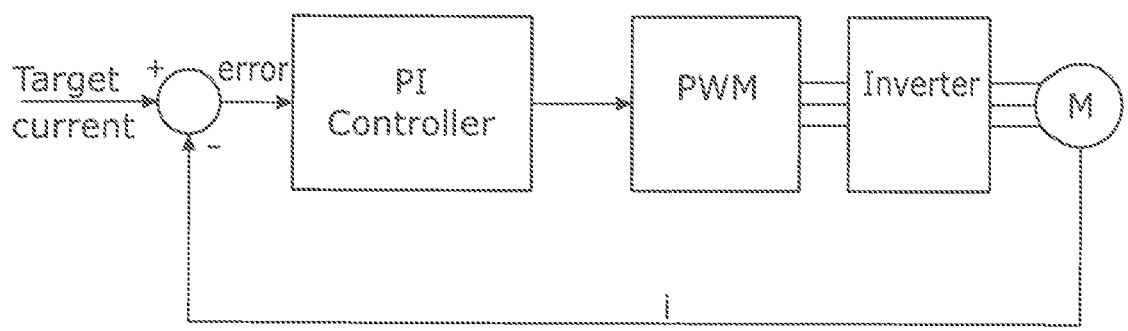
FIG. 1 is an overview of a prior art motor circuit for driving a multi-phase brushless electric motor.
Figure 2:
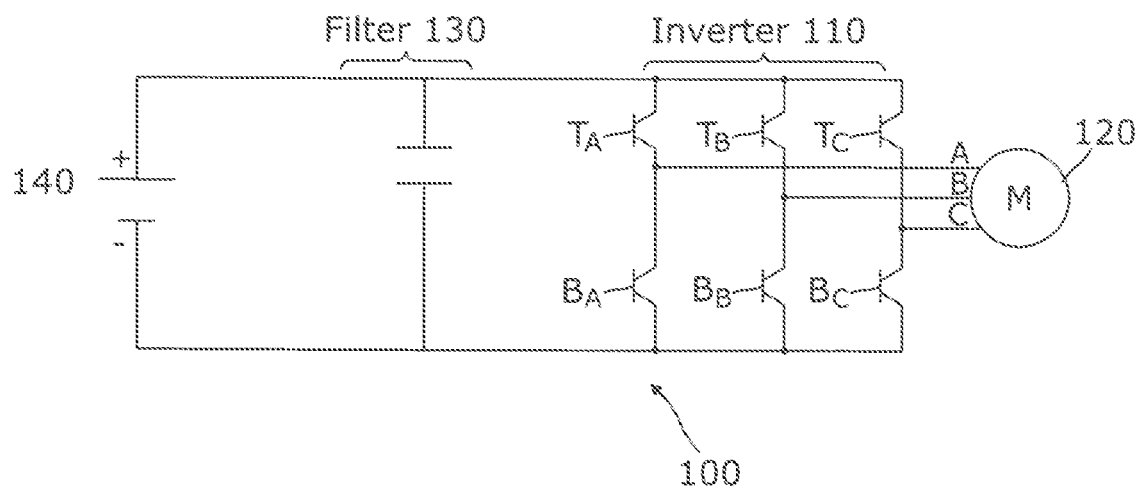
FIG. 2 is a prior art voltage source inverter circuit for applying PWM signals to the motor.
Figure 3:
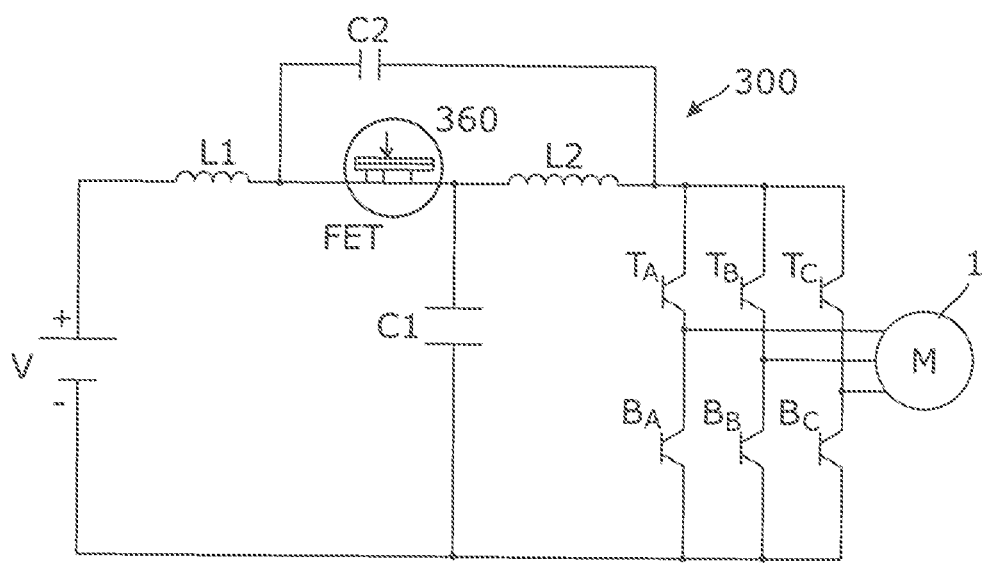
FIG. 3 is a prior art quasi-Z source converter motor circuit for applying PWM signals to a motor.

The z-network comprises a two port network, meaning it has two input nodes and two output nodes. The input nodes are connected to the two terminals of a battery source. The specific topology of the —network may be as shown in the example of FIG. 3. Between the input and output port are two capacitance C1 and C2, each comprising a bank of separate capacitors, and two inductors L1 and L2. The network also includes source switch 360, such as a field effect transistor. This can be opened and closed to alter the mode of operation of the inductive network between and ST mode and a non-ST mode.

The inverter bridge 320 comprises a set of switches forming a three phase bridge 18, for use with a three phase motor. For motors with more than three phases the bridge may also have more phases. Each arm of the bridge comprises a pair of switches in the form of a top transistor TA, TB, TC and a bottom transistor BA, BB, BC connected in series between the two output nodes of the Z-network. There are therefore three top switches connected to one output node and three bottom switches connected to the other output node.

Figure 5:
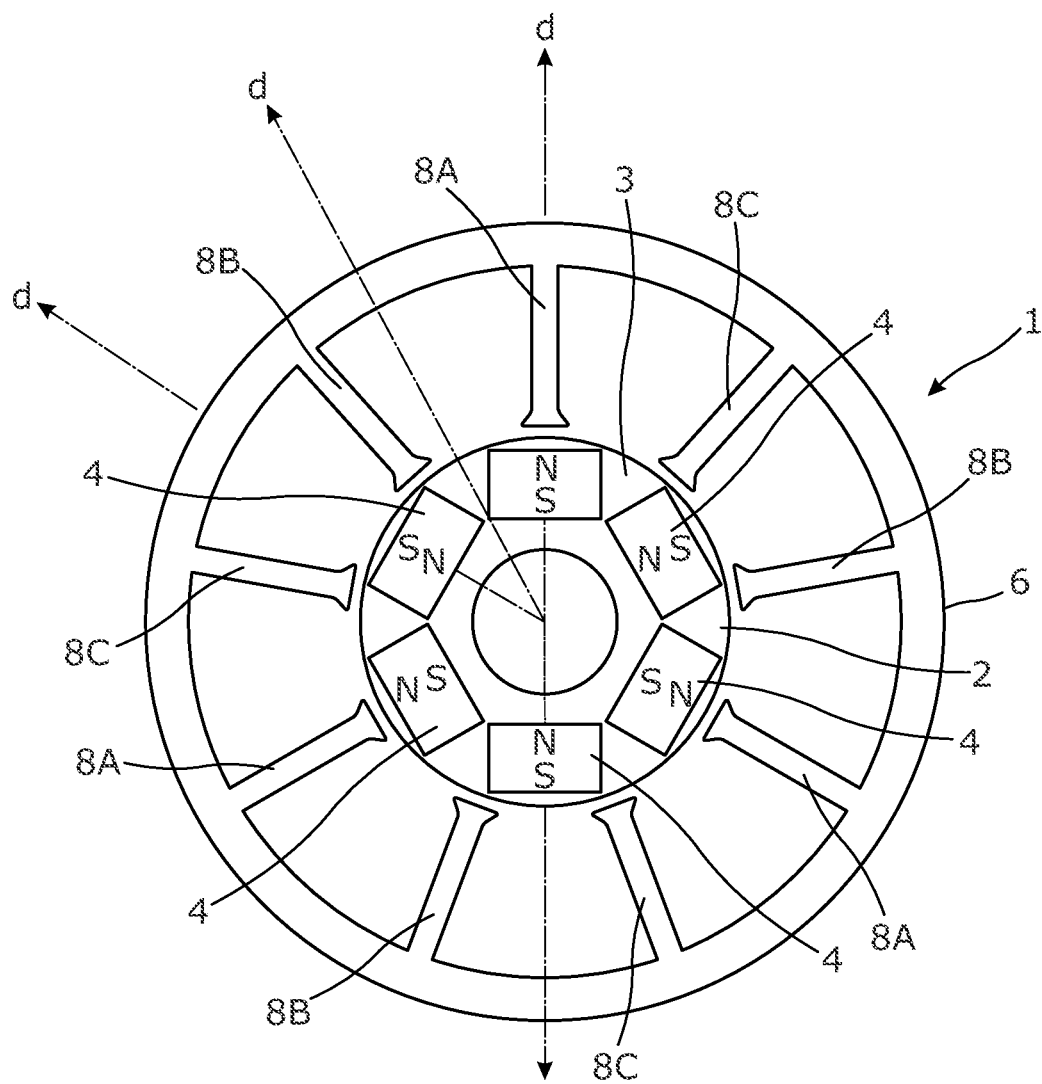
FIG. 5 is an overview of a 3 phase motor that may be driven by the circuit of FIG. 4.

The Z-source converter circuit 300 can be used to drive a three phase brushless motor such as the one shown in FIG. 5. This comprises a three phase brushless motor 1 by way of example is provided which comprises a rotor 2 having for example six embedded magnets 4 within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets 4 where the lines of magnetic flux from the rotor are in the radial direction, and the q axes are spaced between the d axes where the lines of magnetic flux from the rotor are in the tangential direction.

A stator 6 comprises a nine slot copper wound element having three groups of three teeth 8A, 8B, 8C each group of teeth having a common winding forming a respective phase. There are therefore three electrical cycles in each full rotation of the rotor, and the three teeth 8A, 8B, 8C in any phase are always in the same electrical position as each other.

The three motor windings not shown, generally designated as phases A, B and C, are connected in a star network. The phase windings are coiled around the stator teeth 8A, 8B, and 8C respectively. The motor windings 12, 14, 16 are each tapped off from between a respective complementary pair of top and bottom transistors of the inverter. The transistors are turned on and off in a controlled manner by the controller 350 which includes a processing means such as a micro-processor and optional memory to provide pulse width modulation of the potential applied to each of the phase windings and hence also the current flowing through the windings. This in turn controls the strength and orientation of the magnetic field produced by the windings.

The PWM controller 350 includes a counter which counts up repeatedly from zero to a set maximum value, the time taken to reach the maximum value being equal to one PWM period. The start of the count is aligned with the start of the PWM period. Once the maximum is reached the counter is reset and the count repeated.

Figure 6:
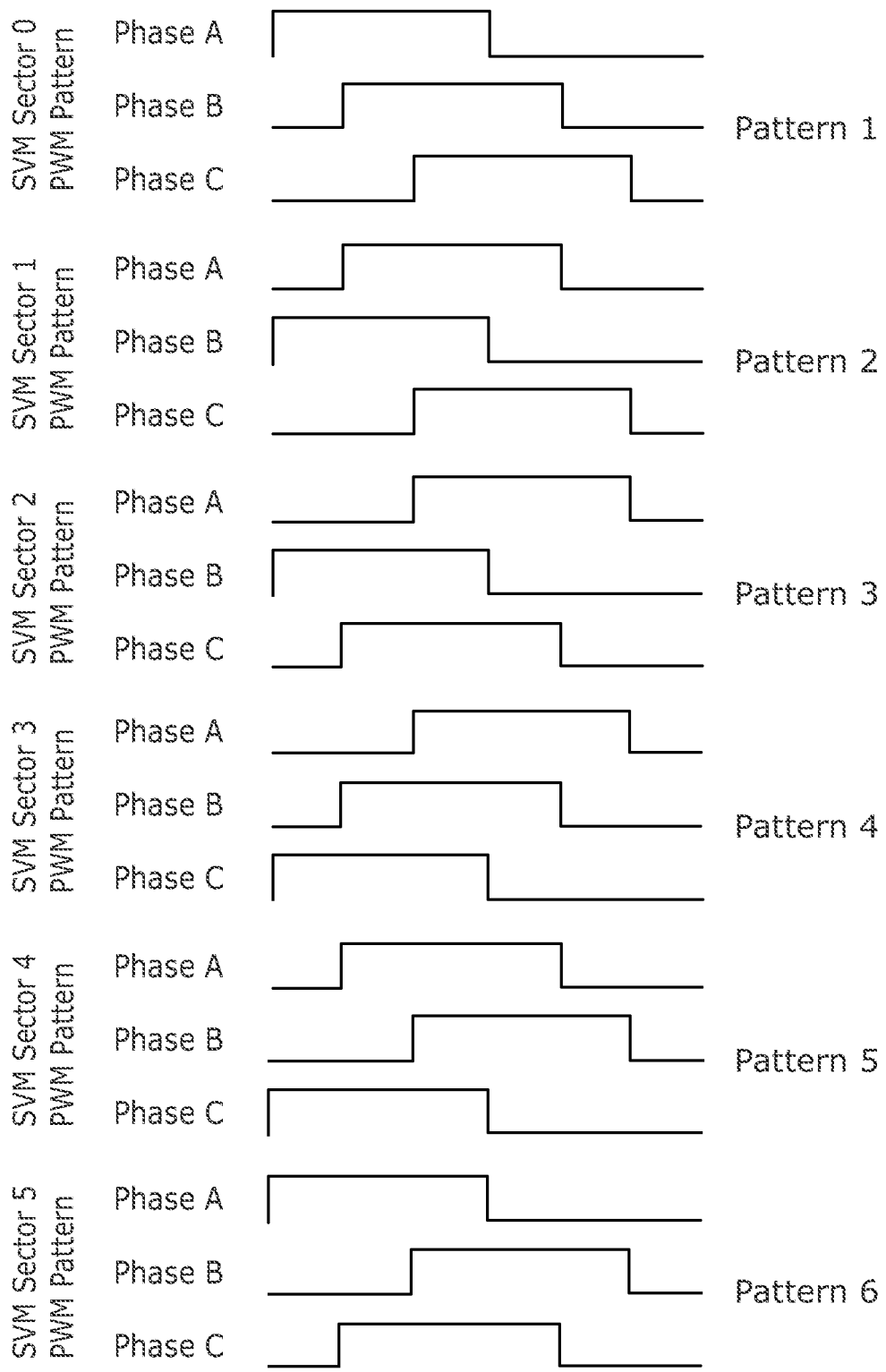
FIG. 6 shows the six normal PWM states that may be applied to be motor during the NST mode of operation, albeit not edge aligned as required by the invention.

Referring to FIG. 6, during motoring each motor phase in a three phase system should only be connected to either a positive supply voltage or the ground and there are therefore eight possible usable states of the control circuit. Each of these states is available for use during a drive mode of the motor, a so called NST mode. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. The two states not shown are State 0 and State 8, neither of which applies any drive to the motor but can be safely used. State 0 is a zero volt state in which all of the windings are connected to ground and state 7 is a zero volt state in which all the windings are connected to the supply rail.

States 1, 2, 3, 4, 5 and 6 are herein also referred to as states +A, −C, +B, −A, +C and −B respectively, because they each represent the states in which the voltage applied across the windings is in a positive or negative direction for a respective one of the phases. For example in the +A state the A phase is connected to the supply rail and the other two phases are connected to the ground link, and in the −A state the connections are reversed.

Because the electric circuit includes a Z network, one other state is possible. In this eighth state, an inverter state, the source switch is opened and one or all of the phases of the motor are shorted across the supply rail and ground by holding closed both the top and bottom switches of that phase. When connected in this condition the motor is said to be operating in a shoot through (ST) mode, or non-drive mode, and when operated in one of the other 8 states 0 to 7 it is said to be operating in a non-shoot through (NST) mode or drive mode.

Figure 7:
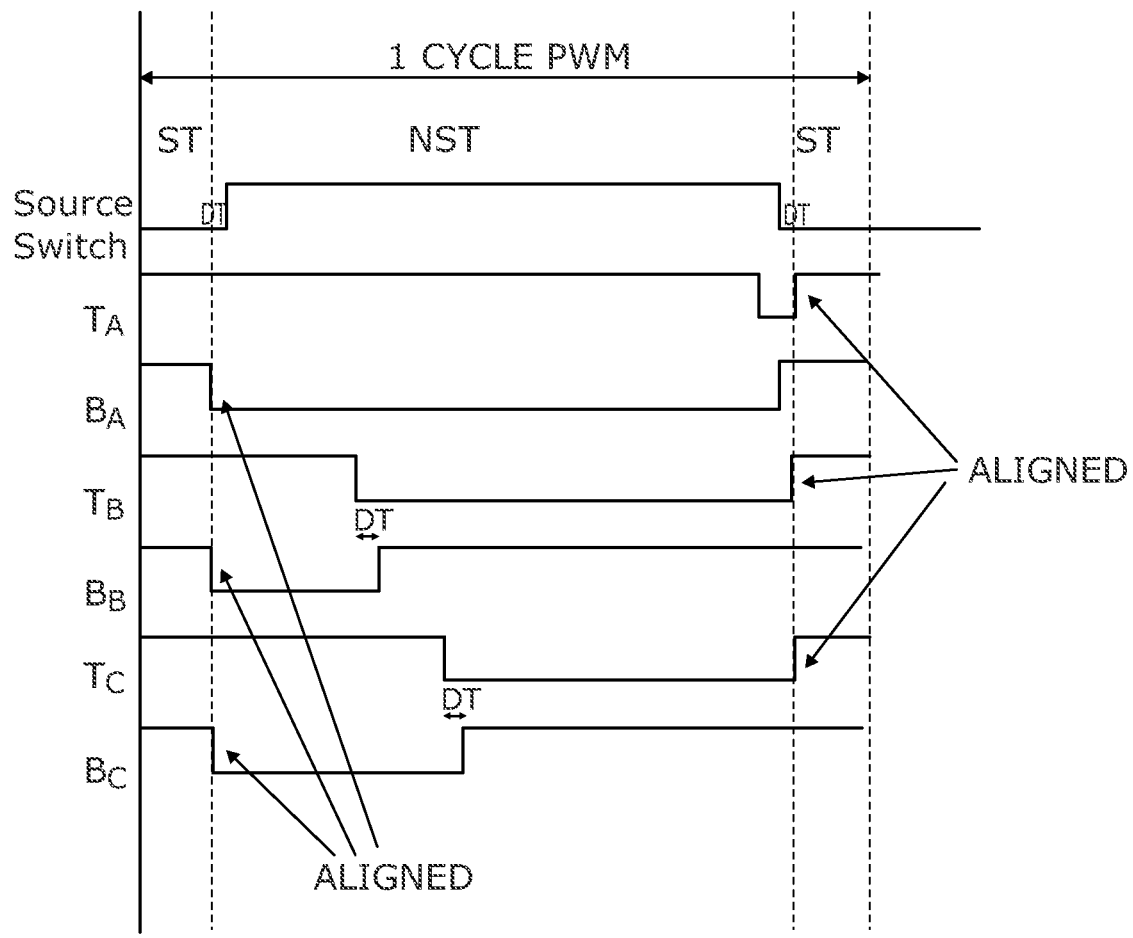
FIG. 7 shows the switching pattern of the inverter switches and the Z-FET when the motor circuit of FIG. 4 is in use.

When the inverter of the circuit is being controlled by the controller to produce pulse width modulation of the switches, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms In this embodiment the following specific switching pattern for the switches of the inverter and the source switch are applied by the PWM controller. The pattern is represented in FIG. 7 of the drawings. Only one of the three phases, Phase A, is shown where the traces for TA and BA correspond to the top and bottom switches in the phase A arm of the inverter.

During a first portion of the PWM period, which is a non-drive portion of the PWN cycle within the meaning of the claimed invention, starting when the count is zero and ending when the value of the count reaches a predefined value stored in the memory, the Z-FET is held open and the inverter is operated in the ST mode whereby all three of the phases are shorted. As shown in FIG. 7 this is achieved by turning ON both the top and bottom switches TA and BA of phase A. At this time the source switch is held open (OFF and non-conducting) to disconnect the two banks of capacitors from each other so that they do not loose their charge.

During a second portion of the PWM period following the first portion the inverter is operated in the NST mode, which defines a drive portion of the PWM cycle within the meaning of the claimed invention, allowing for driving of the motor. In this drive portion the PWM signals for the bottom switches are leading edge aligned with the start of the drive portion and the trailing edge is moved dependent on the duty ratio of the PWM signal that is demanded by the controller. The PWM signals for the top switches are trailing edge aligned with the end of the drive portion and the leading edge is moved dependent on the duty ratio of the PWM signal that is demanded by the controller. The source switch is held open during this mode to connect the load to the battery. The range of modulation available is determined by how long this NST mode lasts within the PWM period. As shown it occupies about half of the total PWM period.

Note also that the source switch is held open for a short period when the inverter switches change state, achieved by keeping the source switch open for a short time following the end of the first non-drive portion and by opening the source switch briefly during the switching of the inverter switches at the end of the drive portion. This ensures that the switches are not damaged during switching as in a real implementation the switches do not change state instantaneously.

During a third portion of the PWM period, which is a non-drive portion, following the second portion the source switch is again held open to isolate the load from the battery and the top and bottom switches TA and BA of the inverter are operated in the ST mode whereby all of the phases are shorted.

Figure 8:
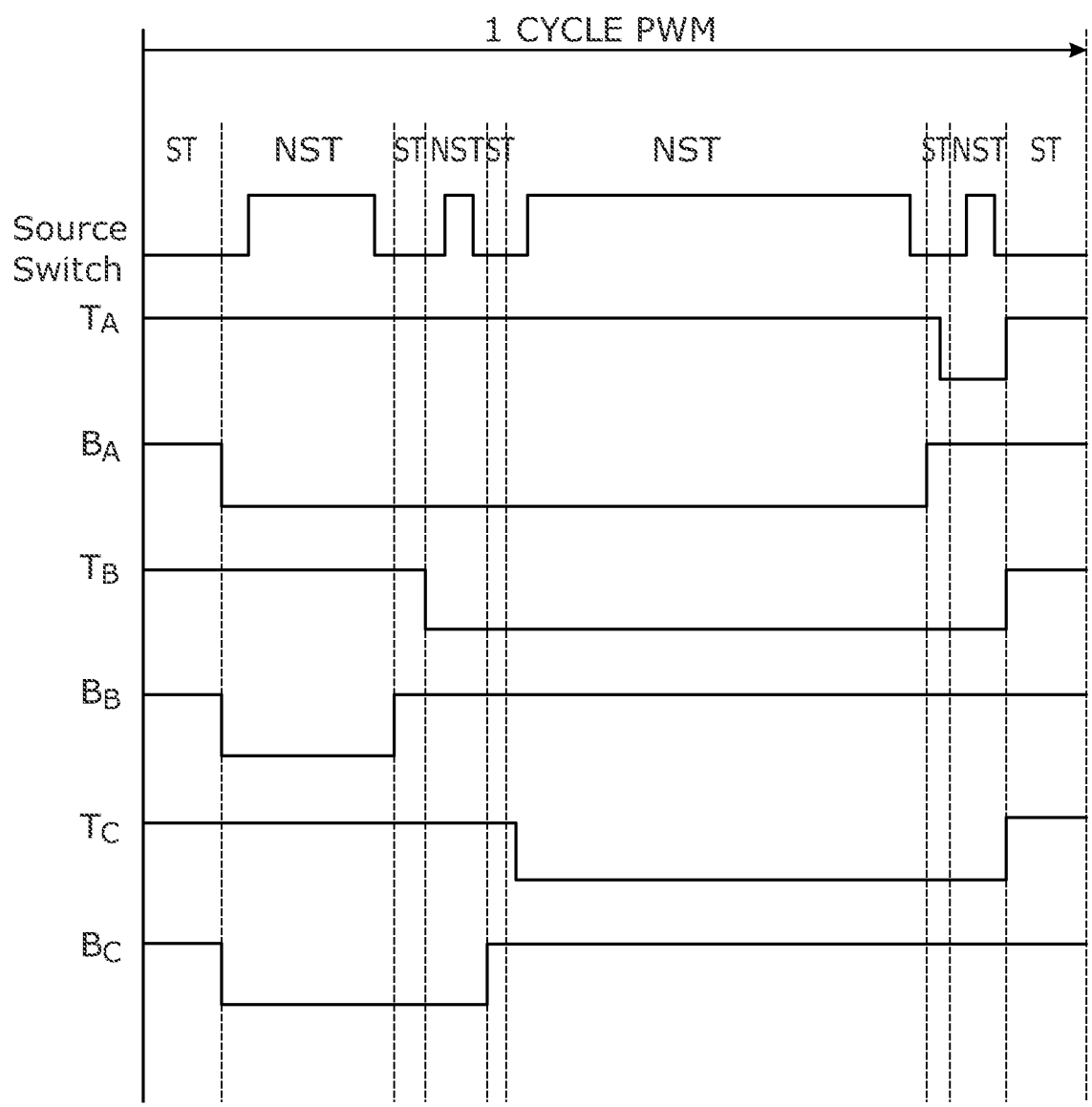
FIG. 8 shows an alternative switching pattern that may be applied by the motor circuit of FIG. 4.

In an alternative shown in FIG. 8, additional short ST states are added at the time of the trailing edge of the PWM patterns to prevent damage to the switches and small periods of deadtime DT are also included by extending slightly the ST times to just after the start and just prior to the end of the drive portion. This may be needed if the inverter switches cannot be operated with small or zero dead times. Typically this is the case where the switches do not open or close rapidly relative to the PWM period. These additional ST periods require the source switch to be opened and closed an additional three times during each PWM period. The applicant has appreciated that this may be preferable to applying states 0 and 7 as the ST periods generate effectively a negative dead time.

The invention claimed is:

1. A drive circuit for an electrical load such as a multi-phase motor, the drive circuit comprising:
    a two port LC inductive network having a pair of input nodes and a pair of output nodes, the network comprising a source switch operable to switch the network between an ST state and an active state;
    an inverter connected to the two output nodes of the LC inductive network having a plurality of top switches which selectively connect a respective phase of the load, to a first one of the two output nodes of the LC inductive network and a plurality of bottom switches which selectively connect a respective phase of the load to a second one of the two output nodes of the LC inductive network,
    and a controller for controlling the On-Off state of each of the switches of the inverter and the On-OFF state of the source switch, the controller in use operating the switches within each PWM period to provide:
    a non-drive portion of the PWM period in which the source switch is held open and the top and bottom switches of at least one phase are held closed so that the drive circuit is operating in an ST mode,
    a drive portion of the PWM period which immediately follows or immediately precedes the non-drive portion in which the source switch is closed and the top and bottom switches are arranged so that for each phase the top and bottom switches are not held open at the same time so that he motor is operating substantially in an NST mode, and
    in which the controller is configured to employ a PWM pattern in which all of the bottom switches or all of the top switches are moved from the closed state to an open state simultaneously with the start of the drive portion and all of the bottom switches or all of the top switches are moved from the open state to the closed state simultaneously with the end of the drive portion,
    and further in which the source switch is moved from the open state to the closed state substantially at the start of the drive portion and is moved from the closed state to the open state substantially at the end of the drive portion.

2. A drive circuit according to claim 1 in which the drive portion has a fixed duration within each cycle of the PWM pattern whereby the position of the start and end of the drive portion in each cycle is fixed.

3. A drive circuit according to claim 1 in which the drive portion of the PWM period immediately follows the non-drive portion within the PWM period, and the controller provides a second non-drive portion that immediately follows the drive portion in which the source switch is held open and the inverter top and bottom switches are also held open so that the drive circuit is operating in the ST mode.

4. A drive circuit according to claim 3 in which the duration of the three portions fills the PWM period.

5. A drive circuit according to claim 3 in which the controller sets the duty ratio of the top switch and bottom switch in each phase during the drive portion according to the required output of the motor.

6. A drive circuit according to claim 1 in which the LC network comprises a quasi-Z-source converter topology.

7. A drive circuit according to claim 1 in which the controller is configured to case the source switch to move from the open state to the closed state shortly after the time at which all of the bottom switches or all of the top switches are moved from the closed state to an open state simultaneously with the start of the drive portion.

8. A drive circuit according to claim 7 in which the controller is configured to cause the source switch to move from the closed state to the open state shortly before a time at which all of the bottom switches or all of the top switches are moved from the open state to the closed state simultaneously with the end of the drive portion.

9. A drive circuit according to 8 in which the controller is configured to cause the source switch to be held open (non-conducting) continuously during the or each non-drive portion of the PWM period to disconnect the phase switches from the source.

10. A drive circuit according to claim 8 in which the controller is configured to cause the source switch to only open and close once in each PWM period, to define the transitions at the start and end of the drive portion.

11. A drive circuit according to 7 in which the controller is configured to cause the source switch to be held open (non-conducting) continuously during the or each non-drive portion of the PWM period to disconnect the phase switches from the source.

12. A drive circuit according to claim 7 in which the controller is configured to cause the source switch to only open and close once in each PWM period, to define the transitions at the start and end of the drive portion.

13. A drive circuit according to claim 11 in which the controller is configured to cause the source switch to only open and close once in each PWM period, to define the transitions at the start and end of the drive portion.

14. A method of driving a drive circuit for an electrical load such as a multi-phase motor, the drive circuit comprising:
    a two port LC inductive network having a pair of input nodes and a pair of output nodes, the network comprising a source switch operable to switch the network between an ST state and an active state;
    an inverter connected to the two output nodes of the LC inductive network having a plurality of top switches which selectively connect a respective phase of the load, to a first one of the two output nodes of the LC inductive network and a plurality of bottom switches which selectively connect a respective phase of the load to a second one of the two output nodes of the LC inductive network,
    and a controller for controlling the On-Off state of each of the switches of the inverter and the On-OFF state of the source switch, the method comprising the steps of causing the controller to operate the switches within each PWM period to provide:

a non-drive portion of the PWM period in which the source switch is held open and the top and bottom switches of at least one phase are held closed so that the drive circuit is operating in the ST mode, a drive portion of the PWM period which immediately follows or immediately precedes the non-drive portion in which the source switch is closed and the top and bottom switches are arranged so that for each phase the top and bottom switches are not held open at the same time so that he motor is operating substantially in the NST mode, and in which the controller is configured to employ a PWM pattern in which all of the bottom switches or all of the top switches are moved from the closed state to an open state simultaneously with the start of the drive portion and all of the bottom switches or all of the top switches are moved from the open state to the closed state simultaneously with the end of the drive portion, and further in which the source switch is moved from the open state to the closed state substantially at the start of the drive portion and is moved from the closed state to the open state substantially at the end of the drive portion.

* * * * *